(12) United States Patent
Uhlik

(10) Patent No.: US 6,760,599 B1
(45) Date of Patent: Jul. 6, 2004

(54) METHOD AND APPARATUS FOR SELECTING A BASE STATION

(75) Inventor: Christopher Richard Uhlik, Danville, CA (US)

(73) Assignee: ArrayComm, Inc., San Jose, CA (US)

( * ) Notice: Subject to any disclaimer, the term of this patent is extended or adjusted under 35 U.S.C. 154(b) by 566 days.

(21) Appl. No.: 09/676,140

(22) Filed: Sep. 29, 2000

(51) Int. Cl.$^7$ .............................. H04B 7/00; H04Q 7/20
(52) U.S. Cl. ...................... 455/525; 455/436; 455/437; 455/450; 455/524
(58) Field of Search ............................... 455/67.1, 442, 455/437, 434, 422, 450, 525, 524, 453, 436, 422.1

(56) References Cited

U.S. PATENT DOCUMENTS

| | | | | |
|---|---|---|---|---|
| 4,955,082 A | * | 9/1990 | Hattori et al. ............... 455/440 |
| 5,042,082 A | * | 8/1991 | Dahlin ......................... 455/437 |
| 5,212,806 A | * | 5/1993 | Natarajan .................... 455/525 |
| 5,537,685 A | * | 7/1996 | Matsuno ....................... 455/502 |
| 5,579,319 A | * | 11/1996 | Daniel .......................... 370/337 |
| 5,634,192 A | * | 5/1997 | Meche et al. ................ 455/437 |
| 5,809,397 A | * | 9/1998 | Harthcock et al. ......... 455/13.2 |
| 5,809,430 A | * | 9/1998 | D'Amico ..................... 455/525 |
| 5,838,672 A | * | 11/1998 | Ranta ........................... 370/335 |
| 6,044,272 A | * | 3/2000 | Kobylinski et al. ......... 455/437 |
| 6,064,890 A | * | 5/2000 | Hirose et al. ............... 455/513 |
| 6,108,322 A | * | 8/2000 | Kotzin et al. ................ 370/333 |
| 6,243,372 B1 | * | 6/2001 | Petch et al. .................. 370/350 |
| 6,304,755 B1 | * | 10/2001 | Tiedemann et al. ......... 455/437 |
| 6,321,090 B1 | * | 11/2001 | Soliman ....................... 455/440 |
| 6,356,739 B1 | * | 3/2002 | Ranta ......................... 455/67.11 |
| 6,433,739 B1 | * | 8/2002 | Soliman ....................... 342/387 |
| 6,438,117 B1 | * | 8/2002 | Grilli et al. .................. 370/331 |
| 6,442,146 B1 | * | 8/2002 | Onodera et al. ............. 370/321 |
| 6,526,279 B1 | * | 2/2003 | Dent ........................... 455/437 |
| 6,532,363 B1 | * | 3/2003 | Pussinen .................. 455/435.1 |
| 6,556,834 B1 | * | 4/2003 | Kobayashi et al. ......... 455/464 |
| 6,584,325 B1 | * | 6/2003 | Shakhgildian .............. 455/525 |
| 6,594,494 B1 | * | 7/2003 | Kakehi ........................ 455/437 |

* cited by examiner

Primary Examiner—Nay Maung
Assistant Examiner—Sujatha Sharma
(74) Attorney, Agent, or Firm—Blakely, Sokoloff, Taylor & Zafman LLP

(57) ABSTRACT

In one embodiment, the present invention comprises receiving a first broadcast burst from a first base station of a radio communications system, the first broadcast message including a first broadcast information sequence representing the power with which the first broadcast burst was transmitted, and measuring the received signal strength of the first broadcast burst. The invention further comprises receiving a second broadcast burst from a second base station of the radio communications system, the second broadcast burst including a second broadcast information sequence representing the power with which the second broadcast burst was transmitted, and measuring the received signal strength of the second broadcast burst. The invention further includes selecting a base station of the radio communications system for communication of data based on the first and second broadcast information sequence and the received signal strength of the first and second broadcast bursts.

49 Claims, 7 Drawing Sheets

|     | Base Station | | Remote Terminal |
| --- | --- | --- | --- |
| 300 | Acquire GPS Timing | | |
| 302 | Determine BCH slot time | | |
| 304 | | BCH ⇒ | |
| 306 | | | Scan BCH channels |
| 308 | | | Acquire Frame Timing |
| 310 | | | Acquire Synchronization |
| 312 | | | Build Map of Base Stations BCHs and BSCCs |
| 314 | | | Select Base Station |
| 316 | | | Build CR using UTID and transmit power |
| 318 | | | Scramble CR using BSCC |
| 320 | | ⇐ Configuration Request | |
| 322 | Unscamble CR using BSCC | | |
| 324 | Determine Spatial Signature of Remote CR | | |
| 326 | | Configuration Message ⇒ | |
| 328 | | | Adjust timing and power |
| 330 | | ⇐ Traffic Request | |
| 332 | | Traffic Assignment ⇒ | |
| 334 | | ⇐ Traffic ⇒ | |
| 336 | | Send packet ⇒ | |
| 338 | | ⇐ Send DA and packt | |
| 340 | | Send DA and packet ⇒ | |
| 342 | | ⇐ Send DA and packet | |

Figure 9

METHOD AND APPARATUS FOR SELECTING A BASE STATION

BACKGROUND OF THE INVENTION

1. Field of the Invention

The present invention applies to radio communications systems in which several remote terminals communicate voice or data with several different base stations and, in particular, to such a system in which a remote terminal selects one from among a plurality of different base stations to begin a communications session.

2. Description of the Prior Art

Mobile radio communications systems such as cellular voice radio systems typically have several base stations in different locations available for use by mobile remote terminals, such as cellular telephones or wireless web devices. Each base station typically is assigned a set of frequencies or channels to use for communications with the remote terminals. The channels are different from those of neighboring base stations in order to avoid interference between neighboring base stations. As a result, the remote terminals can easily distinguish the transmissions received from one base station from the signals received from another. In addition, each base station can act independently in allocating and using the channel resources assigned to it.

Such radio communications systems typically include a broadcast channel (BCH). The BCH is broadcast to all remote terminals whether they are registered on the network or not and informs the remote terminals about the network. In order to access the network, a remote terminal normally tunes to and listens to the BCH before accessing the network. A remote terminal will typically scan a range of likely frequencies when it wants to access the network until it finds the strongest BCH, it will then use the information in the BCH to request access to the network. Such a request typically results in an exchange of information about the network using separate control and access channels and ends in the remote terminal receiving an assignment to a particular base station.

When a remote terminal moves to another location or when traffic load changes, the system may handover or hand-off the remote terminal's assignment to another base station. In some systems, this assignment is done using information obtained from the remote terminal, for example in systems with MAHO (mobile assisted hand-off). In any event, central control requires resources at a central network control facility and the selections are primarily based on indirect information about the remote terminal. Such central control increases the complexity of the network and requires that more of the communications channel capacity be dedicated to base station selection and handover activity.

The present invention allows remote terminals to select from among many base stations without consuming significant overhead channel resources. This allows for better base station selections using almost no central network resources and almost none of the communications channel resources.

BRIEF SUMMARY OF THE INVENTION

In one embodiment, the present invention comprises receiving a first broadcast burst from a first base station of a radio communications system, the first broadcast message including a first broadcast information sequence representing the power with which the first broadcast burst was transmitted, and measuring the received signal strength of the first broadcast burst. The invention further comprises receiving a second broadcast burst from a second base station of the radio communications system, the second broadcast burst including a second broadcast information sequence representing the power with which the second broadcast burst was transmitted, and measuring the received signal strength of the second broadcast burst. The invention further includes selecting a base station of the radio communications system for communication of data based on the first and second broadcast information sequence and the received signal strength of the first and second broadcast bursts.

BRIEF DESCRIPTION OF THE DRAWINGS

The present invention is illustrated by way of example, and not by way of limitation, in the figures of the accompanying drawings in which like reference numerals refer to similar elements and in which:

FIG. 9 is a diagram illustrating a communications sequence according to one embodiment of the present invention.

DETAILED DESCRIPTION OF THE INVENTION

Basic Structure

Figure 1:
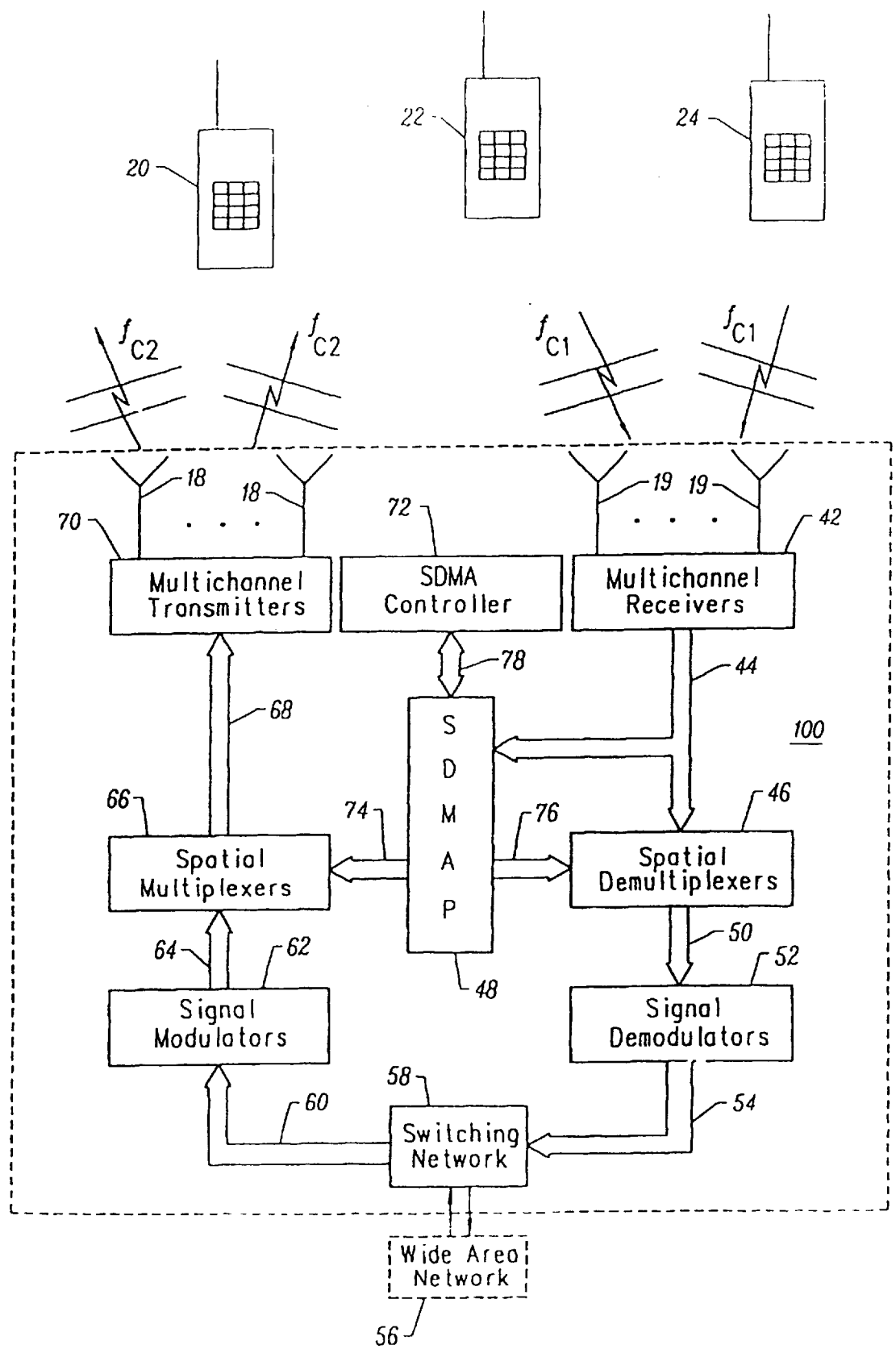
FIG. 1 is a diagram illustrating an exemplary architecture of a wireless communication system according to one embodiment of the present invention.
Figure 2:
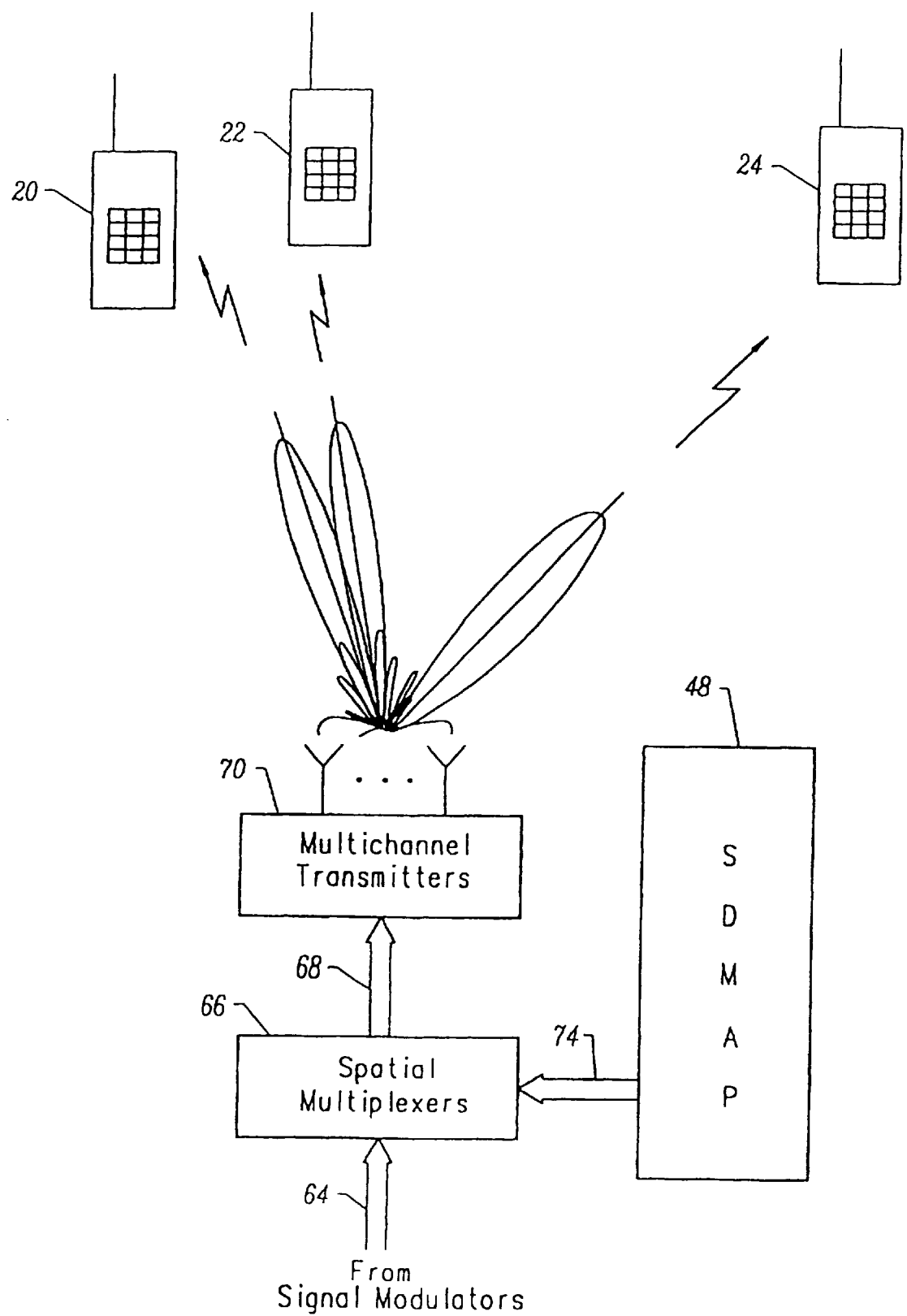
FIG. 2 is a diagram illustrating transmission patterns of a multi-channel spatial diversity transmitter according to one embodiment of the present invention.

FIG. 1 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). A switching network 58 interfaces with a WAN 56 for providing multi-channel duplex operation with the WAN by switching incoming WAN data to lines 60 of the base station 100 and switching outgoing signals from the base station 100, on lines 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. An example of a transmit antenna pattern that may be created is shown in FIG. 2. Suitable technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

Returning to FIG. 1 spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a non-linear multidimensional signal processing unit. The demodulated received signals 54 are then available to the switching network 58 and the WAN 56. The multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA system, multiple codes, as in a CDMA system, or some combination of these well-known multiple access techniques.

Figure 3:
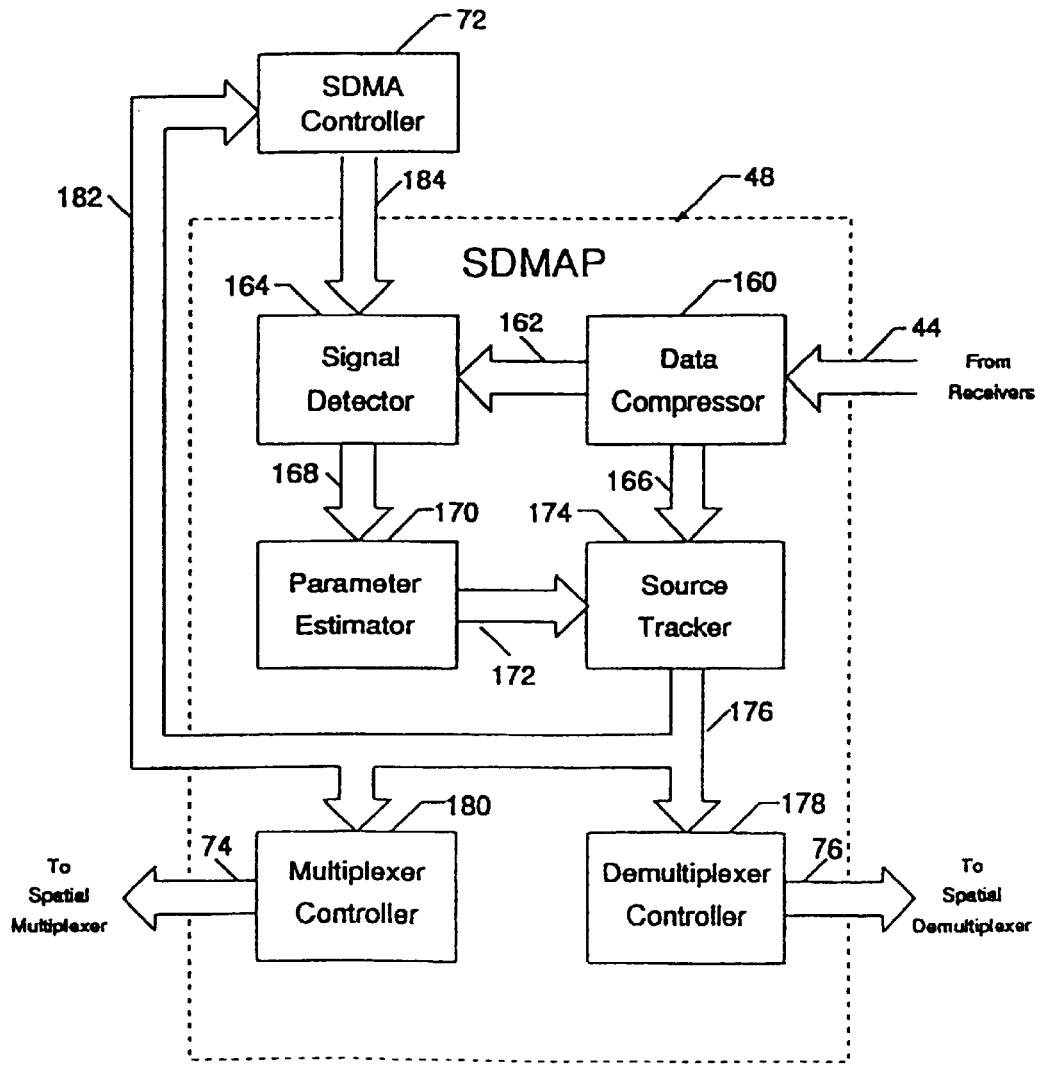
FIG. 3 is a block diagram illustrating a spatial diversity multiple access processor according to one embodiment of the present invention.

FIG. 3 shows a breakdown of a Spatial Division Multiple Access signal Processor (SDMAP) 48. The function of the SDMAP includes determining how many signals are present in a particular channel, estimating signal parameters such as the spatial location of the transmitters (i.e., directions-of-arrival (DOAs) and distance from the base station), and determining the appropriate spatial demultiplexing and multiplexing schemes. The inputs 44 to the SDMAP include outputs of base station receivers, one for each receiving antenna. In one embodiment, the receivers perform quadrature detection of the signals as in current systems, in which case there are in-phase (I) and quadrature (Q) components (signals) output from each channel behind each antenna. In another embodiment, a single down-converted component, I or Q or any combination thereof, is used. In one embodiment, the receivers digitize the data before passing it to the SDMAP. In another embodiment, digitization is performed in the data compressor 160.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights 76 for a spatial demultiplexer, implemented in this embodiment as a linear combiner, i.e., a weight-and-sum operation. In a third embodiment, time-of-arrival (TOA)-related parameters from the parameter estimator are used in conjunction with signal correlation parameters to ascertain which signals are multi-path versions of a common signal. Relative delays are then calculated such that the signals can be coherently combined, thus further increasing the quality of the estimated signals.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multi-channel constant-modulus algorithms (CMA) which are well-known in the art.

In another embodiment, extended Kalman filters, also well-known in the art, can be used to exploit these and similar properties. In these and similar embodiments, the function of the spatial demultiplexer 46 is assumed by the SDMAP 48, and the outputs 76 of the SDMAP are the spatially demultiplexed signals to be sent to the demodulators.

Referring again to FIG. 3, data compression 160 is performed to reduce the amount of data, and, in one embodiment, consists of accumulation of a sample covariance matrix involving sums of outer products of the sampled receiver outputs in a particular channel. Hereafter, these sampled outputs are referred to as data vectors, and there is one such data vector at each sample time for each of the channels assigned to a particular base station. In another embodiment, the compressed data are simply the unprocessed data vectors. If I and Q signals 44 are output from the receivers, each data vector is a collection of $m_r$ complex numbers, one for each of the $m_r$ receiver/antenna pairs.

In a third embodiment, data compression also includes using known signal information such as training sequences present in wireless digital systems and mobile unit transponder responses in current analog systems to calculate time-of-arrival (TOA) of a distinct periodic signal feature, a parameter containing valuable information related to the distance between cell sites and the wireless transmitter which is exploited in this embodiment.

Compressed data 162 are passed to a signal detector 164 for detection of the number of signals present in the channel. In one embodiment, statistical detection schemes are employed in conjunction with information from a SDMA controller 72 to estimate the number of sources present in the channel. This information and the (compressed) data 168 are sent to a parameter estimator 170 where estimates of signal parameters including those related to the source locations (e.g., DOAs and range) are obtained.

Location-related parameter estimates 172 are passed to a source tracker 174. In one embodiment, the function of the source tracker is to keep track of the positions of each of the transmitters as a function of time. This is implemented by known nonlinear filtering techniques such as the aforementioned extended Kalman filter (EKF). In another embodiment, velocities and accelerations of each of the wireless units in a particular channel are tracked as well. Inputs to the EKF in one embodiment include the DOAs and TOAs from the local base station. In another embodiment, DOA and TOA measurements from other nearby cell sites also receiving transmissions from the mobile units are incorporated along with known locations of the cell sites to further improve the estimation accuracy of the EKF as is well-known in the art. The tracker 174 outputs are sent along with the (compressed) data 176 to a spatial demultiplexer controller 178, to control the function of the spatial demultiplexer, and to a spatial multiplexer controller 180 to control the function of the spatial multiplexer.

Figure 4:
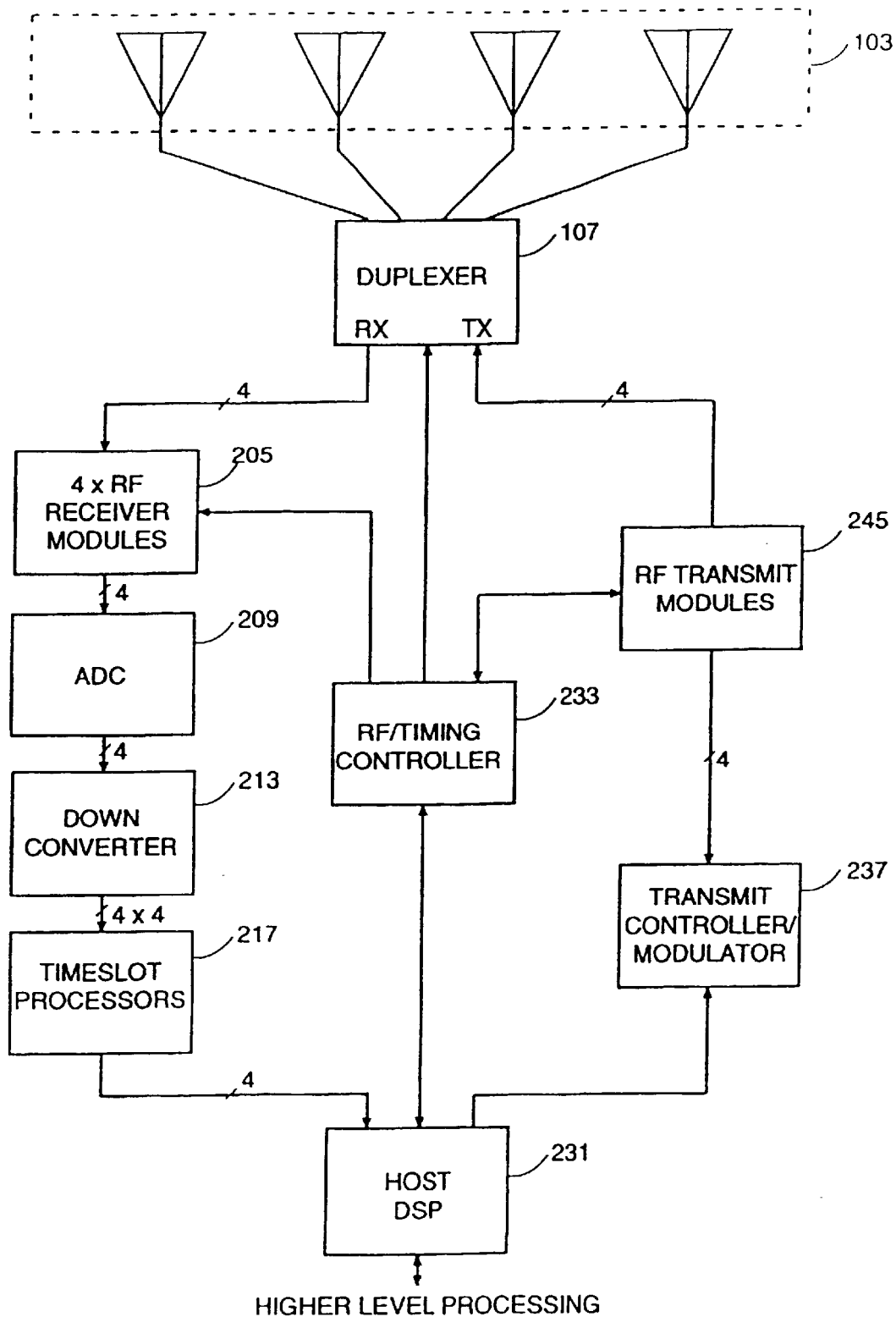
FIG. 4 is a simplified block diagram of a base station on which an embodiment of the invention can be implemented.

FIG. 4 shows an alternative embodiment of a wireless communications system suitable for implementing the present invention. This system is typically coupled to a switching network and WAN similarly to the system of FIG. 1 such as switching network 58 and WAN 56. In FIG. 4, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at, for example, −2×384=−768 kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;

receiving uplink burst data from the timeslot processors 217;

programming the timeslot processors 217;

processing the uplink signals, including de-encrypting, de-scrambling, error correcting code checking, and burst deconstruction of the uplink;

formatting the uplink signal to be sent for higher level processing in other parts of the base station;

formatting service data and traffic data for further higher processing in the base station;

receiving downlink messages and traffic data from the other parts of the base station;

processing of downlink bursts (burst construction, encoding, scrambling and encryption);

formatting and sending downlink bursts to a transmit controller/modulator, shown as 237;

programming the transmit controller/modulator 237, including determining and sending transmit weight vectors to the transmit controller/modulator 237;

controlling the RF controller shown as 233; and maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit-data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Remote Terminal

Figure 5:
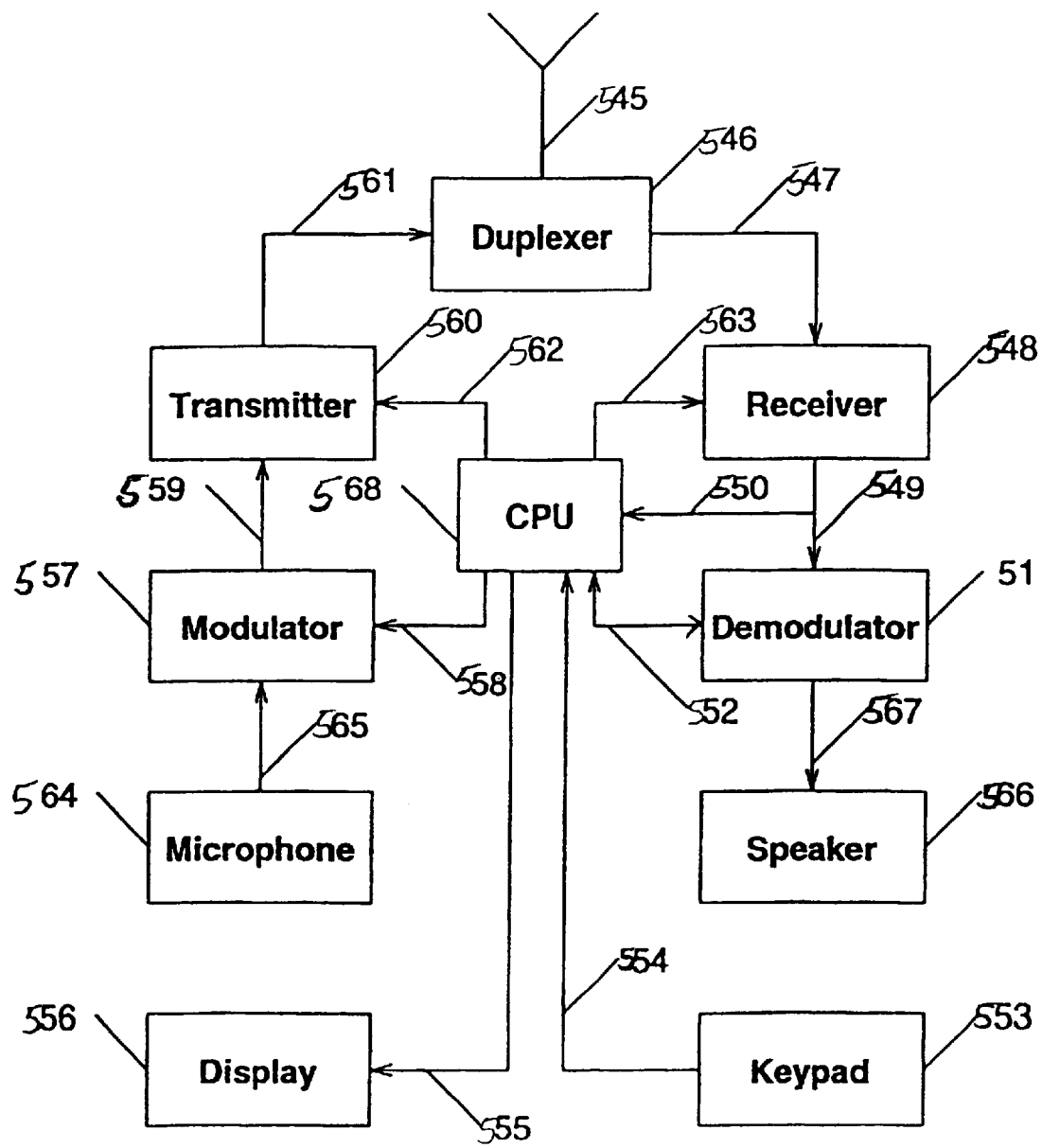
FIG. 5 is a block diagram of a remote terminal suitable for use with the present invention.

FIG. 5 depicts an example component arrangement in a remote terminal that provides data or voice communication. The remote terminal's antenna 545 is connected to a duplexer 546 to permit antenna 545 to be used for both transmission and reception. The antenna can be omni directional or for directional. For optimal performance, the antenna can be made up of multiple elements and employ spatial processing as discussed above for the base station. In an alternate embodiment, separate receive and transmit antennas are used eliminating the need for the duplexer 546. In another alternate embodiment where time division diversity is used, a transmit/receive (TR) switch can be used instead of a duplexer as is well-known in the art. The duplexer output 547 serves as input to a receiver 548. The receiver 548 produces a down-converted signal 549 which is the input to a demodulator 551. A demodulated received sound or voice signal 567 is input to a speaker 566.

The remote terminal has a corresponding transmit chain in which data or voice to be transmitted is modulated in a modulator 557. The modulated signal to be transmitted 559, output by the modulator 557, is up-converted and amplified by a transmitter 560, producing a transmitter output signal 561. The transmitter output 561 is then input to duplexer 546 for transmission by the antenna 545.

The demodulated received data 552 is supplied to a remote terminal central processing unit 568 (CPU) as is received data before demodulation 550. The remote terminal CPU 568 can be implemented with a standard DSP (digital signal processor) device such as a Motorola series 56300 DSP. This DSP can also perform the functions of the demodulator 551 and modulator 557. The remote terminal CPU 568 controls the receiver through line 563, the transmitter through line 562, the demodulator through line 552 and the modulator through line 558. It also communicates with a keyboard 553 through line 554 and a display 556 through line 555. A microphone 564 and speaker 566 are connected through the modulator 557 and demodulator 551 through lines 565 and 566, respectively for a voice communications remote terminal. In another embodiment, the microphone and speaker are also in direct communication with the CPU for voice or data communications remote terminals.

The remote terminal's voice signal to be transmitted 565 from microphone 564 is input to a modulator 557. Traffic and control data to be transmitted 558 is supplied by the remote terminal's CPU 568. Control data 558 is transmitted to base stations during registration, session initiation and termination as well as during the session as described in greater detail below.

In an alternate embodiment, the speaker 566, and microphone 564 are replaced or augmented by digital interfaces well-known in the art that allow data to be transmitted to and from an external data processing device (for example, a computer). In one embodiment the remote terminal's CPU is coupled to a standard digital interface such as a PCMCIA interface to an external computer and the display, keyboard, microphone and speaker are a part of the external computer. The remote terminal's CPU 568 communicates with these components through the digital interface and the external computer's controller. For data communications only, the microphone and speaker can be deleted. For voice only communications, the keyboard and display can be deleted.

Broadcast Channel (BCH)

Figure 6:
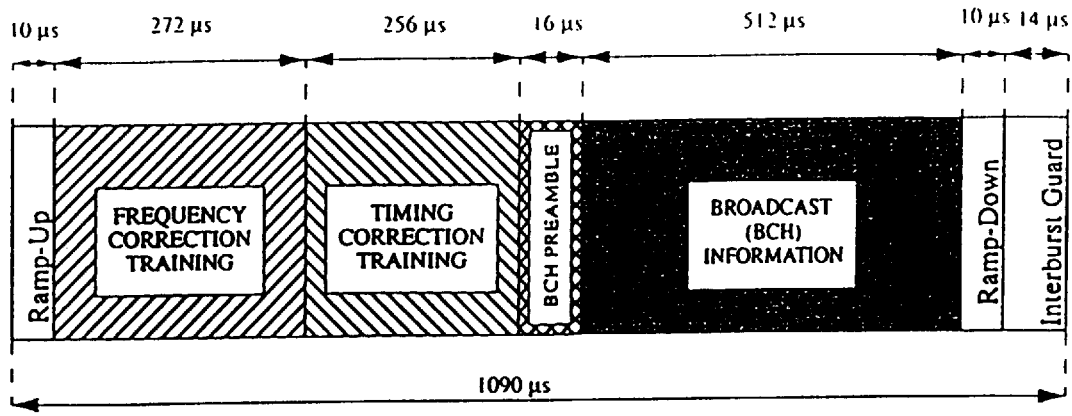
FIG. 6 is a diagram illustrating an example of a broadcast burst structure according to one embodiment of the present invention.

The system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. Accordingly, the BCH burst will create more interference on the system than spatially directed or lower power traffic channels TCH. For this reason, the data and modulation properties of the BCH channel are selected to minimize interference. An example of a broadcast burst structure is shown in FIG. 6. Some of the important BCH burst properties are as follows. The BCH is computationally easy to find by scanning in real time having no knowledge of time-slot boundaries. It communicates enough basic information to enable a subsequent exchange of configuration request CR and configuration message CM between the base station and the user terminal. The BCH also provides good frequency offset and timing update information to all user terminals, even when the BCH is not specifically directed toward any one user terminal in particular.

Table 1, below summarizes the content of an example of a BCH burst, as shown in FIG. 6.

TABLE 1

| Duration | Contents |
| --- | --- |
| 10 μsec | ramp-up |
| 272 μsec | frequency correction training symbols $f_1, f_2, \ldots, f_{136}$ |
| 256 μsec | timing correction training symbols $t_1, t_2, \ldots, t_{128}$ |
| 16 μsec | broadcast preamble $r_1, r_2, \ldots, r_8$ |
| 512 μsec | information symbols $h'_1, h'_2, \ldots, h'_{256}$ |
| 10 μsec | ramp - down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

Each broadcast message is mapped into a broadcast burst with the information shown below in Table 2.

TABLE 2

| Broadcast Message | |
| --- | --- |
| Field | # of Bits |
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station. For a typical system in which base stations have from one to ten antennas, the EIRP can be mapped into five bits using, for example, (2·BStxPwr+10) dBm.

BSCC is the base station color code, used by the user terminal to select training data for uplink bursts and to distinguish broadcasts of different base stations. In one embodiment, there are up to 128 different possible color codes. The color codes can be used to indicate a base station in a different location or a different modulator/demodulator set in the same location.

BSload is the load on the base station, used by the user terminal to determine how frequently to send random access messages. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

In one embodiment, the BCH channel is shared by all base stations in the wireless communication system. Using the 7 bit BSCC, up to 128 base stations can be accommodated. The BCH is part of a time division duplex channel with a repeating frame. The channel that includes BCH is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. In one embodiment, the other traffic channels hop frequencies around and through the BCH. The frames are repeated for each respective base station 1 to 128 to build a superframe as discussed in more detail below. After the last CM, CM128, the superframe repeats and begins again with the next superframe and the BCH for base station 1.

TABLE 3

| | | Uplink | Downlink |
| --- | --- | --- | --- |
| Superframe 1 | Frame 1 | | BS1 |
| | Frame 2 | CR1 | CM1 |
| | Frame 3 | | BS2 |
| | Frame 4 | CR2 | CM2 |

TABLE 3-continued

| | | Uplink | Downlink |
| --- | --- | --- | --- |
| | . | . | . |
| | . | . | . |
| | . | . | . |
| | Frame 255 | | BS128 |
| | Frame 256 | CR128 | CM128 |
| Superframe 2 | Frame 1 | | BS1 |
| | Frame 2 | CR1 | CM1 |
| | . | . | . |
| | . | . | . |
| | . | . | . |

In another embodiment, the BCH is on its own channel and CR and CM are on a separate control channel. Alternately, one BCH can be provided on a constant frequency and a secondary BCH can be provided on another channel with hopping frequency. The hopping channel is described in the CM.

A base station can be considered a collection of base station modems serving a group of RF carriers. Alternatively, a base station can be an installation with a set of modems at a single site. For other system configurations each modem modulator/demodulator set 52, 62 can be considered a base station. Each base station is assigned a unique 32-bit base station identifier, BSID. The BSID is used to derive a base station color code which is defined in one embodiment as follows: BSCC=BSID mod 128. As a function of the BSCC, a base station frequency hops, broadcasts BCH, listens for uplink CR, and sends downlink CM in response to CR. Within a geographical region where radio transmissions overlap, the BSCC is uniquely assigned. No base station should be able to routinely see user terminals that are communicating with a base station of the same color code. Likewise, no user terminal should be able to see two base stations that are assigned the same BSCC. The total number of base stations as well as the number of frames in a superframe, the number of slots in a frame and the particular slots used for transmitting BCH bursts, CRs and CMs can be modified to suit particular applications.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its CR message to a specific base station as shown in Table 3 based on timing. If there are only very few possible power levels for base stations in the system, for example two different transmit power level, then the two power levels can be distinguished by providing two different training sequences. This allows the BSTxPwr bits to be eliminated. For a single base station system, or if all base stations transmit with the same power, the BSTxPwr bits can also be deleted. If there is only one base station, it is not necessary to evaluate path loss but only whether the signal can be received. The rest of the network information can be learned upon registration, described below. Alternatively, since the BCH includes the BSCC, the user terminal can be programmed to read the BSCC and assume that BCH bursts with a common BSCC are from the same base station. In this way, the user terminal can learn a shortened frame repetition interval, and reduce the time needed to register with the system.

Registration

A user terminal forms a relationship with a base station called a registration. This registration begins by listening to the broadcast channel and ends with a handover, timeout, or disconnection. The first step of registration is accomplished by a remote by sending the Configuration Request burst CR and receiving a Configuration Message burst CM. The CM contains basic configuration parameters such as hopping sequence calculation parameters. Using the information from the CM, the user terminal then starts the process of opening an unauthenticated stream using a random access registration request RA-rreq. This unauthenticated stream carries only in-band signaling data used to complete registration and assignment of a registration identifier RED and paging identifier PID. Using the RID assigned at the end of the registration stream, the user terminal can open subsequent streams and it can end registrations. The user terminal can also open subsequent streams in which it can send packets which can be used for many purposes including to perform "network login" to an Internet Service Provider (ISP).

During the registration stream, identities and capabilities are exchanged, operating parameters are set, and a RID and PID are assigned. Later, a new network session may be created and attached to this RID, or an existing session may be handed over. This handover may be from another base station, another base station modem on the same base station (load shifting), or even from a hibernating session on the same base station modem. The specific details of registration are provided here as examples only. Many other registration scenarios are also possible within the scope of the present invention.

Base Station Selection

Referring to FIG. 9, the frame timing is established by the base stations that are in the area and transmitting on a pre-programmed RF carrier. It is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. Precise timing also allows the remote terminals to make distance-based comparisons of the base stations as will be described in more detail below. The base stations then build the BCH frame 302 described above and broadcast in their respective assigned slots 304.

When a user terminal turns on, it scans for BCH bursts on the well-known, optionally pre-programmed, RF carrier or carriers 306 to find basic frame timing alignment 308 and frequency synchronization 310. After timing and synchronization are established, the user terminal listens on the broadcast channel to the BCH bursts of all of the base stations that it can receive. A selection can be made by the user terminal after listening for one or more superframes on the broadcast channel. In one embodiment, in order to make the best selection, the user terminal will listen on the broadcast channel for five full superframes. This ensures that every BCH burst from every base station has been received several times and that accurate measurements can be made. For the user terminal to make more accurate measurements of received signal strength and timing delay, several samples of each BCH burst are used. The number of samples and therefore superframes depends on the conditions of the channel, the design of the receiver, the factors that are considered in a base station selection and other considerations. A specific number can be preset, determined ad hoc in each case or it may be varied as conditions change.

Alternatively, if the user terminal requires a faster access time, it can listen only until the first adequate BCH burst is received and send a CR burst to that base station.

The user terminal scans the BCH carrier for BCH bursts, building a map of the base stations and the received statistics 312. From this base station map, the user terminal selects the most suitable base station 314. It also uses the BCH to precisely adjust its oscillator frequency and adjust its frame timing reference 308, 310. This is done using the frequency training and timing training sequences in the BCH burst, described above. Then, using its remote or user terminal ID (UTID) it builds 316 and sends 320 a Configuration Request CR, timed relative to the BCH burst for the selected base station. In one embodiment, the CR is scrambled using the BSCC that was received in the BCH from the selected base station 318.

An example of a base station map that a remote terminal can create based on the received BCH bursts is shown below as Table 4. In Table 4, the different base stations are listed and identified under BSCC. This information is received in each BCH burst. Alternatively, the BCH bursts can be listed in some sequential ordering and BSCC can be recorded as a separate column of values. The base station map contains any one or more of the following: BSCC, BSTxPwr, BSload, received signal strength, received signal delay, and quality measures of the received BCH bursts such as bit error rates (BER), signal to interference (SINR) and signal to noise ratios (SNR) etc. After the remoter terminal is registered with a base station the table can include an indication of the base station with which the remote is registered. In alternate embodiments, any one or more of the parameters shown in the table may be deleted and others may be added. In the example of Table 4, the values are summed to arrive at a suitability value. The base station with the lowest suitability value is selected for a registration attempt, i.e. a CR will be sent to the corresponding base station.

TABLE 4

| BSCC | BSTxPwr | BSload | RSSI | Delay | BER | SINR | Suitability |
|---|---|---|---|---|---|---|---|
| ... | ... | ... | ... | ... | ... | ... | ... |
| 17 | 29 | 6 | 2 | 20 | 5 | 10 | 72 |
| 18 | 0 | n/a | n/a | n/a | n/a | n/a | n/a |
| 19 | 15 | 5 | 5 | 18 | 2 | 9 | 54 |
| 20 | 25 | 7 | 20 | 29 | 10 | 12 | 103 |
| 21 | 5 | 4 | 8 | 5 | 9 | 12 | 43 |
| 22 | 0 | n/a | n/a | n/a | n/a | n/a | n/a |
| 23 | 0 | n/a | n/a | n/a | n/a | n/a | n/a |
| 24 | 17 | 2 | 12 | 12 | 7 | 8 | 58 |
| ... | ... | ... | ... | ... | ... | ... | ... |

In table 4, BSCC, BSTxPwr and BSload are received from each base station in the BCH burst as described above. BSCC allows the remote terminal to identify and track different base stations. If a base station broadcasts on several BCH frames, the different bursts can be associated. If a base station uses two different BSCCs for two different antenna or modem arrays then the distinction can be followed. Any type of identifiers other than a BSCC can be used depending on the network.

BSTxPwr has been discussed above. The remote terminal typically favors a lower power base station provided that the signal can be adequately received. As an alternative, if fewer parameters are measured and recorded in the base station map, the user terminal selects the base station with the highest power.

Another field in the BCH burst is BSload. This is an index of how much unused capacity is available at the base station. In one embodiment, a user terminal registers with a base station and then requests access whenever a session is desired. When the session is no longer desired, then it is ended until another request for access is sent. A base station that has very little unused capacity may not be able to grant access whenever it is needed. Accordingly, the user terminal will favor the base station with the largest amount of unused capacity. As an additional benefit, by providing the BSload field to the user terminals and allowing user terminals to select a base station with more capacity, network management and traffic allocation is improved, without a complex centralized traffic allocation center. In an alternate embodiment, BSload is not transmitted to the remote. When a base station determines that it is already too heavily loaded, it either fails to respond to a CR or it responds to CR with a CM that denies access to the base station.

Received signal strength (RSSI) is determined by the remote terminal for each BCH burst received from each base station using techniques well-known in the art. The value for RSSI can be taken as the burst's average dBm. In Table 4 a larger value for RSSI indicates a lower received signal strength level.

By using both the power with which the BCH burst was transmitted (BSTxPwr) and the power with which the BCH burst was received (RSSI), the base station map provides an indication of the power loss in the path between the base station and the user terminal. A burst with a high RSSI can be rejected if it began with a much higher BSTxPwr. On the other hand, a burst with a much lower RSSI and a much lower BSTxPwr indicates a clear, low loss channel and can be preferred. This criterion is taken into account in Table 4 when the values in each row are added together. As a result, low transmit power and high RSSI will yield the lowest suitability score.

Received signal delay is a measurement of the relative distance from each base station to the remote. The relative distance of the different base stations is determined by the user terminal comparing the BCH burst time offset of each BCH burst. In the superframe structure of Table 3, each base station sends its BCH burst at the same time in its respective assigned BCH slot. If the base stations are all synchronized to GPS or another timing reference, the delay measures the propagation time from each respective base station to the remote terminal. This time is directly proportional to the distance from the base station to the remote terminal. If the remote terminal is synchronized to the same common timing reference, then absolute distance can be determined. However, the relative distance is all that is required to make a base station selection.

Bit error rate (BER) is determined by the remote terminal for each BCH burst received from each base station using techniques well-known in the art. The value for BER can be taken as a scaled total number of bit errors in the each burst. In Table 4 a larger value for BER indicates a larger number of errors.

Other quality factors such as signal to interference, signal to noise, or any other suitable measurement can also be determined by the remote terminal for each BCH burst received from each base station using techniques well-known in the art. The value for the channel quality value is scaled for use in the map. In Table 4 a larger value for quality indicates a lower quality channel.

The final factor in the map (not shown in Table 4) is whether a base station is currently the one with which the user terminal is registered. The selection process herein can be used when a user terminal first enters a network but is also used periodically when the user terminal is already registered. This ensures that if the user terminal moves or channel conditions change or base station loading conditions change, the user terminal can make the best base station selection for the new circumstances. A base station that is nearly the best will remain the chosen base station so that unnecessary handovers are avoided and to provide some hysteresis to the overall communications system.

In one embodiment, thresholds are applied to at least some of the factors. A threshold can be applied to BSload. A base station with too much load i.e. too little reserve capacity will not be selected even if the other factors make it a strong candidate. Alternatively, in an asynchronous network in which registration may or may not be accompanied by the immediate exchange or data traffic, BSload can be used to discourage but not prevent the selection of the base stations with the least capacity.

A minimum threshold is applied to RSSI. If the RSSI from a base station is too low, then that base station will not be selected even if other factors make it a strong candidate. A threshold is applied to Distance. If the base station is too far away, then that base station will not be selected even if the other factors make it a strong candidate. This is done, in part to prevent an opportunistic reflection or other signal enhancer from forcing a selection of a much more distant base station. In one embodiment, remote terminals advance or delay the transmission of traffic channel and other bursts to equalize the propagation delay between different base stations. If a remote terminal advances its timing beyond a certain limit, then its bursts will interfere with bursts in the immediately preceding slot. As a result, the base station distance must be limited so that a remote's timing advance can be limited to an amount that will not cause this intereference. Other thresholds can also be applied. The particular choice of thresholds will vary depending on the design of the wireless communications system.

The user terminal can make a base station selection using any one or more of the factors above. The values in the map are constructed by taking the measurement or the bit sequence received in the BCH burst and scaling it by an appropriate amount. The particular scaling factor for each value will depend on the particular network. A statistical analysis is then performed to provide the optimal selection based on all factors. In the embodiment described above the values are added. In an alternate embodiment, thresholds are applied to rule out any very bad choices, the values for the remaining base stations are scaled and then added. The base station with the lowest score is selected. The lowest score base station will be the one with the best combination of high BSTxPwr, low BSload, high RSSI, low delay and the highest quality channel.

As mentioned above, the user terminal typically receives several transmissions of the BCH burst from each base station before a selection is made. The values and the measurements from each base station can be averaged before adding them to the base station map. Alternatively the highest or lowest values can be used or the most recently clearly received values can be used. In another embodiment, a derivative of the samples is taken for each base station and the base station with the highest positive slope is selected. In other words, the values of each base station are compared over time and the base station whose values are improving the fastest is selected.

Returning to FIG. 9, if the intended base station successfully receives the CR and has available capacity, it unscrambles the CR 322, and determines the spatial signature of the user terminal 324. The user terminal receives a Configuration Message burst CM in reply 326. The CM, described in greater detail below, contains sufficient information for the user terminal to learn its distance and RF path-loss to the base station, correct its timing advance, adjust its power control, and learn the parameters of frequency hopping (e.g. frame numbering and BSCC) 328. Several base stations may be probed with a CR to find the most responsive base station. Based on this information from the CM, the user terminal, when it has data to transmit, can start a session, beginning with a random access registration request RA-rreq 330. If resources are available, the base station sends an Access Assignment AA 332 to the user terminal assigning a traffic channel. The base station and user terminal exchange various access control parameters including encryption keys on this established stream. Finally a RID and PID are assigned. Using this RID, the user terminal can establish secure streams (e.g. RA-rts/AA-cts) in which it transmits and receives internet or any other types of data or voice packets 334.

The traffic channel includes a data acknowledgement DA or a data invalid DI response to each transmitted data packet. The DA and DI messages are transmitted as a part of the next data packet from the recipient in the next slot. In a time division duplex frame, the base station and the user terminal alternate slots 336, 338, 340, 342, as shown in FIG. 9. Accordingly, if any slots are not received properly, the data can quickly be retransmitted. This reduces the size of the data buffers at the respective base station and user terminal modems. As shown in Tables 3 and 4, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 5

| 1 | 2 | 3 | | 1 | 2 | 3 | | 1 | 2 | 3 | ... |
|---|---|---|---|---|---|---|---|---|---|---|---|
| Uplink Slots | | | Guard Time | Downlink Slots | | | Guard Time | Uplink Slots | | | |

Periodically, the user terminal scans the BCH to update its base station map. A user terminal can vary the frequency of these scans depending on its mobility, the quality of the existing channel and other factors. The scanning can be limited to those BCH bursts which are the best or near best based on the measurements in the existing map. Those BCH bursts that improve with each successive superframe can be sampled more frequently than those which are worse or do not change. In one embodiment, when a particular base station is determined to be a better choice than the existing one, the user terminal will attempt registration by sending a CR burst at the appropriate time scrambled with the BSCC of the selected base station. It the base station responds with a CM burst, then registration proceeds as described above, after which the user terminal has two active registrations. When the user terminal desires a network session, it can select the base station which is the best at that time or select only the base station with which it is more recently registered. Any other registration can be cancelled through a network controller, by request of the user terminal or after a time-out with the old base station.

When it detects a better base station, the user terminal may send a CR to this new base station and possibly handover its network session. It may however, not receive a CM burst in reply or registration may fail for another reason. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Channel Considerations

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omnidirectionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. The parameters of the frequency hopping scheme are initially unknown to the user terminal. This maximizes the flexibility of the network and increases the flexibility of the user terminal. As explained below, the frequency hopping parameters are transmitted to the user in the CM burst.

Configuration Request CR

Figure 7:
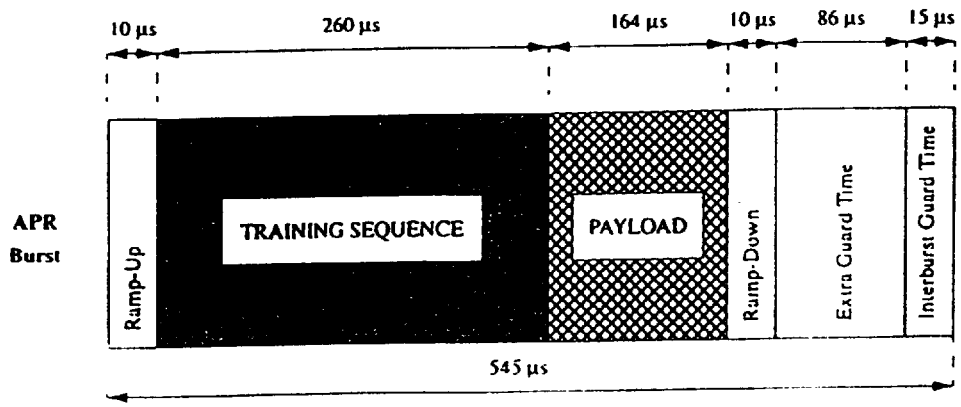
FIG. 7 is a diagram illustrating an example of a Configuration Request burst structure according to one embodiment of the present invention.

An example of a Configuration Request burst structure is shown in FIG. 7. CR bursts are distinguished from random access RA and traffic TCH bursts, in part, by a special CR spatial training sequence. The CR training sequence is longer than normal and has periodic properties that make finding timing alignment especially computationally efficient. The CR burst is transmitted from a user terminal at an unknown distance from the base station. Because of time-of-flight considerations, the user terminal time base is delayed relative to the base station. Furthermore, its CR transmission is also delayed because its timing advance is not yet initialized. Shortening the CR burst by 86 $\mu$sec allows it to arrive up to 86 $\mu$sec late without spilling over into the next time-slot. These 86 $\mu$sec mean that a user terminal 10 kilometers from the base station can send a CR burst that will land completely within its time-slot. If this burst is seen by the base station, and replied to, the corresponding CM will contain a timing advance adjustment which will properly position subsequent data bursts.

Table 6 below summarizes the content of the example CR burst as shown in FIG. 7. The 82 information symbols are constructed from the configuration request message using modulation and coding.

TABLE 6

| Duration | Contents |
|---|---|
| 10 $\mu$sec | ramp-up |
| 260 $\mu$sec | training symbols $a_1, a_2, \ldots, a_{130}$ |
| 164 $\mu$sec | information symbols $h_1, h_2, \ldots, h_{82}$ |
| 10 $\mu$sec | ramp-down |
| 86 $\mu$sec | extra guard time |
| 15 $\mu$sec | inter-burst guard time |

CR spatial training is the same for all base stations and the base station does not necessarily know the location of the user terminal before receiving the CR. CRs are transmitted by user terminals at a fixed offset from BCH transmissions as shown in Table 3. The resulting time-multiplexed registration channel easily distinguishes CRs sent to different ones of several nearby base stations. Furthermore, CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst CR by the physical layer. A configuration message is mapped onto a standard downlink burst by the physical layer. The information symbols of the present CR burst are mapped out as shown in Table 7, below. Any of the items listed below can be deleted and transmitted later during the registration cycle or not at all based on the needs of the system.

TABLE 7

Configuration Request Message

| Field | # of Bits |
|---|---|
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc.) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time-slot to allow for unknown time-of-flight from the user terminal to the base station and typically arrives late in the uplink time-slot receive window.

Configuration Message CM

Figure 8:
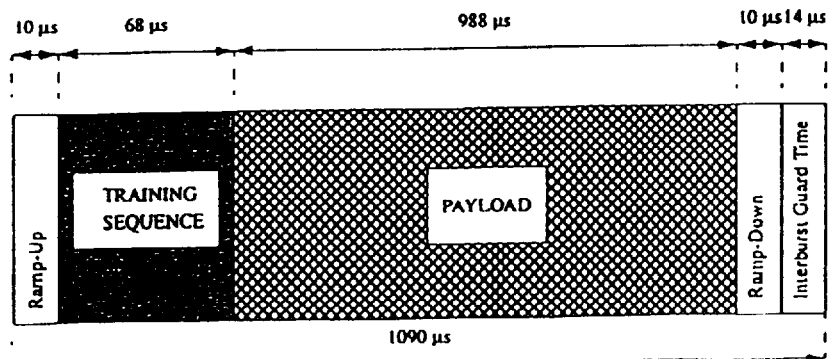
FIG. 8 is a diagram illustrating an example of a Configuration Message burst structure according to one embodiment of the present invention.

Table 8 below summarizes the content of an example Configuration Message burst as shown in FIG. 8. The 494 information symbols are constructed from the configuration message using modulation and coding.

TABLE 8

| Duration | Contents |
|---|---|
| 10 μsec | ramp-up |
| 68 μsec | training symbols $a_1, a_2, \ldots, a_{130}$ |

TABLE 8-continued

| Duration | Contents |
|---|---|
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, exactly 5 msec after sending a downlink BCH burst, whenever CR was received on the corresponding uplink time-slot. Using this timing, CM is directed to the requesting user terminal. CM is also sent in a spatially directed signal based on the analysis of the spatial signature, for example parameters, such as DOA and TOA of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 9, below summarizes the content of the CM burst as shown in FIG. 8. Any of the items listed below can be deleted and transmitted later during the registration cycle or not at all based on the needs of the system.

TABLE 9

Configuration Message

| Field | # of Bits |
|---|---|
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2·pwrCtrl−16) dB.

timingAdjust: timing advance that the user terminal should apply to future random access bursts: timing advance=timingAdjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1, the relationship between physical and logical carriers hops each frame.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 to 4, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data are exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a first broadcast burst from a first base station of a radio communications system at a user terminal, the first broadcast message including a first broadcast information sequence including an index of how much unused capacity is available at the first base station;
   receiving a second broadcast burst from a second base station of the radio communications system at the user terminal, the second broadcast burst including a second broadcast information sequence including an index of how much unused capacity is available at the second base station; and
   selecting a base station of the radio communications system at the user terminal for communication of data between the selected base station and the user terminal based on the first and second broadcast information sequences.

2. The method of claim 1 wherein receiving the first broadcast burst comprises receiving the first broadcast burst in a broadcast channel at a first specific time within a first assigned slot of a predetermined frame and wherein receiving a second broadcast burst comprises receiving the second broadcast burst in the broadcast channel at a second specific time within a second assigned slot of the predetermined frame from a second base station of the radio communications system.

3. The method of claim 2, further comprising receiving broadcast bursts in the broadcast channel at further specific times within further assigned slots of a predetermined frame from further base stations of the radio communications system, the further broadcast messages including a broadcast information sequence including an index of how much unused capacity is available at the respective base station and wherein selecting a base station further comprises selecting a base station based on the broadcast information sequences of the further base stations.

4. The method of claim 2 further comprising:
   sending a system access request burst having a timing relationship with the predetermined frame, wherein the base station to which the burst is directed is based on the timing relationship.

5. The method of claim 1 wherein the sequence including an index of how much unused capacity is available at the respective base station, represents the transmit and receive bit rates of each modem of each respective base station over a period of a few minutes measured against maximum possible loading.

6. The method of claim 5, wherein the index of how much unused capacity is available at the respective base station takes into account the number of amplifiers and diversity antennas available at the base station.

7. The method of claim 1, wherein the broadcast information sequence includes a code to identify the base station.

8. The method of claim 7, wherein the code to identify the base station comprises a base station color code.

9. The method of claim 1, further comprising measuring the timing of receiving the first broadcast burst and measuring the timing of receiving the second broadcast burst and wherein selecting a base station further comprises selecting a base station based on the measured timing.

10. The method of claim 9, wherein the first and second broadcast bursts are synchronized to a common timing reference.

11. The method of claim 10 wherein the common timing reference is a satellite clock transmission received by a satellite receiver at each base station.

12. The method of claim 1, wherein the broadcast information sequence includes a power sequence that is related to the power with which the burst was transmitted from the respective base station and wherein selecting a base station further comprises selecting a base station based on the power sequence.

13. The method of claim 1 wherein selecting a base station comprises selecting a base station based on whether a communications session with a base station is in progress and the identity of the base station with which the communication session is in progress.

14. The method of claim 1 wherein selecting a base station further comprises:
   building a map of base stations for which broadcast bursts have been received;
   inserting data from the broadcast information sequences received from each base station into the map; and
   scoring each base station based on the data inserted into the map.

15. The method of claim 14 wherein inserting data further comprises scaling the data using scaling values appropriate to each item of data that is inserted.

16. The method of claim 14 further comprising measuring attributes of each received broadcast burst and inserting the measurement into the map and wherein scoring each base station further comprises scoring each base station based on the data inserted into the map and based on the measurements inserted into the map.

17. The method of claim 16 wherein measuring attributes comprises measuring the signal strength at which each broadcast burst is received.

18. The method of claim 16 wherein measuring attributes comprises measuring the time delay with which each broadcast burst is received.

19. A machine-readable medium having stored thereon data representing sequences of instructions which, when executed by a machine, cause the machine to perform operations comprising:
receiving a first broadcast burst from a first base station of a radio communications system, the first broadcast message including a first broadcast information sequence including an index of how much unused capacity is available at the first base station;
receiving a second broadcast burst from a second base station of the radio communications system, the second broadcast burst including a second broadcast information sequence including an index of how much unused capacity is available at the second base station; and
selecting a base station of the radio communications system for communication of data based on the first and second broadcast information sequences.

20. The medium of claim 19 wherein the instructions for receiving the first broadcast burst comprise instructions causing the machine to perform operations comprising receiving the first broadcast burst in a broadcast channel at a first specific time within a first assigned slot of a predetermined frame and wherein the instructions for receiving a second broadcast burst comprise instructions causing the machine to perform operations comprising receiving the second broadcast burst in the broadcast channel at a second specific time within a second assigned slot of the predetermined frame from a second base station of the radio communications system.

21. The medium of claim 20, further comprising instructions causing the machine to perform operations comprising receiving broadcast bursts in the broadcast channel at further specific times within further assigned slots of a predetermined frame from further base stations of the radio communications system, the further broadcast messages including a broadcast information sequence including an index of how much unused capacity is available at the respective base station and wherein the instructions for selecting a base station further comprise instructions causing the machine to perform operations comprising selecting a base station based on the broadcast information sequences of the further base stations.

22. The medium of claim 19 wherein the sequence including an index of how much unused capacity is available at the second base station, represents the transmit and receive bit rates of each modem of each respective base station over a period of a few minutes measured against maximum possible loading.

23. The medium of claim 19, further comprising instructions causing the machine to perform operations comprising measuring the timing of receiving the first broadcast burst and measuring the timing of receiving the second broadcast burst and wherein the instructions for selecting a base station further comprise instructions causing the machine to perform operations comprising selecting a base station based on the measured timing.

24. The medium of claim 19, wherein the broadcast information sequence includes a power sequence that is related to the power with which the burst was transmitted from the respective base station and wherein the instructions for selecting a base station further comprise instructions causing the machine to perform operations comprising selecting a base station based on the power sequence.

25. The medium of claim 19 wherein the instructions for selecting a base station further comprise instructions causing the machine to perform operations comprising:
building a map of base stations for which broadcast bursts have been received;
inserting data from the broadcast information sequences received from each base station into the map; and
scoring each base station based on the data inserted into the map.

26. A user terminal comprising:
means for receiving a first broadcast burst from a first base station of a radio communications system, the first broadcast message including a first broadcast information sequence including an index of how much unused capacity is available at the first base station;
means for receiving a second broadcast burst from a second base station of the radio communications system, the second broadcast burst including a second broadcast information sequence including an index of how much unused capacity is available at the second base station; and
means for selecting a base station of the radio communications system for communication of data based on the first and second broadcast information sequences.

27. The terminal of claim 26, further comprising means for measuring the timing of receiving the first broadcast burst and means for measuring the timing of receiving the second broadcast burst and wherein the means for selecting a base station further comprises means for selecting a base station based on the measured timing.

28. The terminal of claim 26, wherein the broadcast information sequence includes a power sequence that is related to the power with which the burst was transmitted from the respective base station and wherein the means for selecting a base station further comprises means for selecting a base station based on the power sequence.

29. A method comprising:
transmitting a first broadcast burst from a first base station of a radio communications system, the first broadcast message including a first broadcast information sequence representing the power with which the first broadcast burst was transmitted and the traffic load carried by the first base station as indicated by an index of how much unused capacity is available at the first base station;
transmitting a second broadcast burst from a second base station of the radio communications system, the second broadcast burst including a second broadcast information sequence representing the power with which the second broadcast burst was transmitted and the traffic load carried by the second base station as indicated by an index of how much unused capacity is available at the second base station;
receiving a system access request burst from a remote terminal of the radio communications system indicating a base station selection for communication of data based on the first and second broadcast information sequences.

30. The method of claim 29 wherein transmitting the first broadcast burst comprises transmitting the first broadcast burst in a broadcast channel at a first specific time within a first assigned slot of a predetermined frame, wherein transmitting a second broadcast burst comprises transmitting the second broadcast burst in the broadcast channel at a second specific time within a second assigned slot of the predetermined frame from a second base station of the radio communications system and wherein the base station selection is further based on the timing of the first and second broadcast bursts.

31. The method of claim 30 wherein the system access request burst has a timing relationship with the predetermined frame, indicating the base station to which the burst is directed.

32. The method of claim 30, wherein the first and second broadcast bursts are synchronized to a common timing reference.

33. The method of claim 32 wherein the common timing reference is a satellite clock transmission received by a satellite receiver at each base station.

34. The method of claim 29 wherein the sequence representing the power represents the effective isotropic radiated power of the broadcast burst transmission.

35. The method of claim 34, wherein the effective isotropic radiated power indicates the power transmitted by the base station taking into account the number of amplifiers and diversity antennas available at the base station.

36. The method of claim 29, wherein the broadcast information sequence includes a code to identify the base station.

37. The method of claim 36, wherein the code to identify the base station comprises a base station color code.

38. A broadcast channel in a radio communications system, the channel comprising:
   a repeating frame shared by a plurality of base stations, the frame having a plurality of slots, each base station being assigned to a slot;
   a predetermined timing assigned to each slot, so that each slot of the frame is synchronized at all base stations; and
   a broadcast burst for each base station, for transmission in the respective assigned slot, the burst having a broadcast information sequence, the broadcast information sequence representing the power with which the respective broadcast burst was transmitted and the traffic load carried by the respective base station as indicated an index of how much unused capacity is available at the respective base station.

39. The channel of claim 38, further comprising a plurality of uplink request slots to allow a user terminal to request a traffic channel, each slot of the uplink request slots having a timing relationship with the slots of the repeating frame so that the timing relationship indicates the base station to which the traffic channel request is directed.

40. The channel of claim 38, wherein the broadcast information sequence includes a code to identify the transmitting base station.

41. The channel of claim 38, wherein the predetermined timing is based on a common timing reference received by each base station.

42. A machine-readable medium having stored thereon data representing sequences of instructions which, when executed by a machine, cause the machine to perform operations comprising:
   transmitting a first broadcast burst from a first base station of a radio communications system, the first broadcast message including a first broadcast information sequence representing the traffic load carried by the first base station as indicated an index of how much unused capacity is available at the first base station;
   transmitting a second broadcast burst from a second base station of the radio communications system, the second broadcast burst including a second broadcast information sequence representing traffic load carried by the second base station as indicated by an index of how much unused capacity is available at the second base station;
   receiving a system access request burst from a remote terminal of the radio communications system indicating a base station selection for communication of data based on the first and second broadcast information sequences.

43. The medium of claim 42 wherein transmitting the first broadcast burst comprises transmitting the first broadcast burst in a broadcast channel at a first specific time within a first assigned slot of a predetermined frame, wherein transmitting a second broadcast burst comprises transmitting the second broadcast burst in the broadcast channel at a second specific time within a second assigned slot of the predetermined frame from a second base station of the radio communications system and wherein the base station selection is further based on the timing of the first and second broadcast bursts.

44. The medium of claim 43 wherein the system access request burst has a timing relationship with the predetermined frame, indicating the base station to which the burst is directed.

45. The medium of claim 43 wherein the first and second broadcast bursts are synchronized to a common timing reference.

46. The medium of claim 45 wherein the common timing reference is a satellite clock transmission received by a satellite receiver at each base station.

47. The medium of claim 42 wherein the information sequence further comprises a sequence representing the effective isotropic radiated power of the broadcast burst transmission.

48. The medium of claim 47, wherein the effective isotropic radiated power indicates the power transmitted by the base station taking into account the number of amplifiers and diversity antennas available at the base station.

49. The medium of claim 42, wherein the broadcast information sequence includes a code to identify the base station.

* * * * *